United States Patent [19]

Klein

[11] 3,834,061

[45]* Sept. 10, 1974

[54] LEADER CONNECTOR

[76] Inventor: Gerald B. Klein, 13451 Stuart Ct., Broomfield, Colo. 80020

[ * ] Notice: The portion of the term of this patent subsequent to Feb. 27, 1990, has been disclaimed.

[22] Filed: Aug. 3, 1972

[21] Appl. No.: 277,756

Related U.S. Application Data

[63] Continuation-in-part of Ser. No. 128,015, March 25, 1971, Pat. No. 3,717,907.

[52] U.S. Cl................................... 43/44.9, 24/128
[51] Int. Cl...................... F16g 11/00, F16g 11/02
[58] Field of Search................ 43/43.1, 44.9, 44.83; 24/128 R, 129, 130, 128; 287/80

[56] References Cited
UNITED STATES PATENTS

| 1,771,125 | 7/1930 | Kahle | 43/44.83 |
| 2,577,466 | 12/1951 | Jones | 43/44.83 X |
| 3,023,535 | 3/1962 | Holka et al. | 43/43.1 |
| 3,460,285 | 8/1969 | Perkins | 43/44.9 |
| 3,717,907 | 2/1973 | Klein | 287/80 X |

FOREIGN PATENTS OR APPLICATIONS

| 1,107,445 | 8/1955 | France | 24/128 |

Primary Examiner—Hugh R. Chamblee
Attorney, Agent, or Firm—Frank C. Lowe

[57] ABSTRACT

A connector or a link for joining a leader to a fly line is formed as a small cigar or like shaped member. A passageway opening at each end receives the end of the line and the end of the leader. A transverse hole at the center intersects the passageways from the ends to provide opposing side openings. The end of the line and the end of the leader are threaded through their passageways to project from the side openings. They are then knotted and the knots are pulled back into the side opening to complete the connection.

5 Claims, 19 Drawing Figures

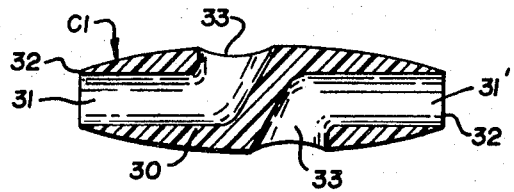
Fig. 8
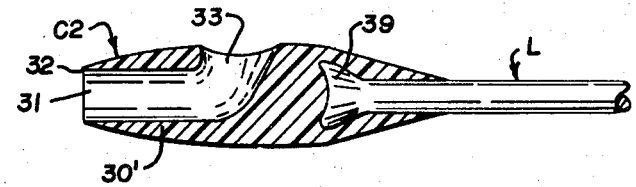
Fig. 9
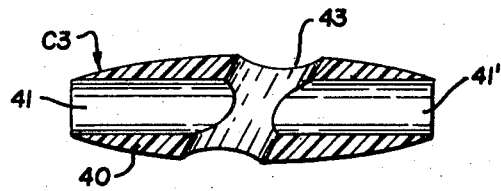
Fig. 10
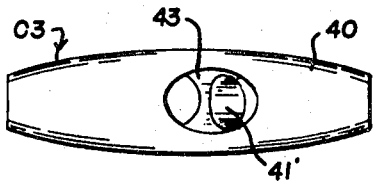
Fig. 11
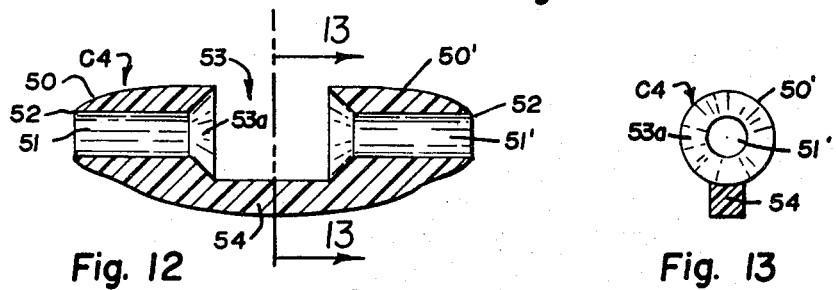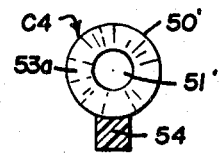
Fig. 12    Fig. 13
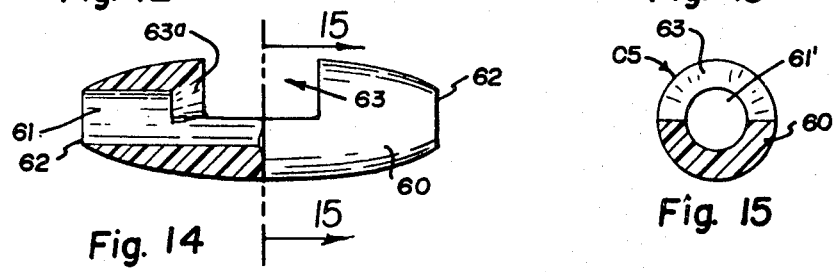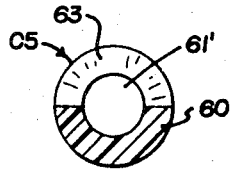
Fig. 14    Fig. 15

LEADER CONNECTOR

This application is a continuation-in-part of my application entitled "Leader Connector" filed Mar. 25, 1971, Ser. No. 128,015, now U.S. Pat. No. 3,717,907 to disclose and claim subject matter set forth in that application and also other subject matter.

The present invention relates to connectors for fishing tackle, and more particularly to connectors which attach a leader to the line. As such, the invention will be hereinafter called a "Leader Connector."

The improved leader connector, constructed according to the present invention, is especially useful for connecting a leader to a fly line, and the utility of the invention is best exemplified by describing the same in connection with a fly line.

Fly fishing involves casting a line a substantial distance over a body of water wherein only the weight of the line is used to effect the cast. To be proficient in the art of fly casting, a fisherman must acquire a high degree of skill and must use good equipment. A skilled fly caster will use a tapered line and tapered leader at the end of this line. The leader may be as much as nine feed long, or longer, and taper from a diameter almost as large as the line diameter at its connection, to a very small tippet at the end of the leader. This taper of the line and leader is essential to a smooth cast with the line and leader unrolling from an outwardly moving loop to their full length when cast. Thus, it is desirable that there be no kinks in the line nor in the leader, especially at the point where the leader is tied to the line.

One of the more difficult aspects to rigging a suitable gear for fly fishing involves tying the end of the leader to the end of the fishing line. The tie must be with a selected knot to avoid kinks and/or slip-separation of the leader from the line. Many leaders are provided with end loops to facilitate this knot tying operation, but a leader may not have the loop. Very often the fly fisherman will cut the end loop from the leader and tie the leader onto the line according to his own system. The line may be expensive, carefully formed, tapered and balanced and it is undesirable to tie a knob in the end of this line and to then cut the knot and a portion of the line each time the leader is changed. However, while knots are not entirely satisfactory, metal clips and swivel connectors, which are commonly used in other types of fishing gear, are usually too heavy and awkward for use with a fly line. Also, such connectors may prevent the leader from being pulled into the guide rings of the fishing rod as is often done when using a fly line with a long leader.

The present invention was conceived and developed with the above considerations in view and comprises, in essence, a leader connector formed as a very small member which may be shaped somewhat like a cigar or an elongated member or the like. This connector has longitudinal passages within it, from each end, which extend to a side opening near the center of the connector. The end of a line and the end of a leader are threaded into the passages from opposite ends of the connector and are then extended from side openings. A simple knot, such as an overhand or figure-eight knot, is tied in the end of the line and a knot, such as a figure-eight knot, is tied in the leader and then the line and leader are pulled to pull the knots into the side opening of the connector, all as hereinafter described in detail.

An object of the invention is to provide a novel and improved leader connector for connecting a leader to a fly line which is easy to tie into place, which holds the line and leader in a straight unkinked alignment at all times, which is so small and compact that it will not interfere with casting and otherwise handling the fly line and which can easily pass through the guide rings of the fishing rod when it is desired to pull the leader onto the fishing rod.

Another object of the invention is to provide a novel and improved leader connector for connecting a leader to a fly line which permits the connections to be made very quickly, using a simple knot at the end of the leader and at the end of the line without the danger of the knot of the leader slipping to separate the leader from the line.

Other objects of the invention are to provide a novel and improved leader connector which is a simple, low cost, neat appearing, rugged item capable of being manufactured by injection molding, or other methods using various selected synthetic resin plastics.

With the foregoing and other objects in view, the present invention comprises certain constructions, combinations and arrangements of parts and elements as hereinafter described, defined in the appended claims and illustrated in preferred embodiment in the accompanying drawing in which:

FIG. 8 is a sectional elevational view similar to FIG. 4, but showing a first alternate embodiment of the connector.

FIG. 9 is a sectional elevational view similar to FIG. 8, but showing a second alternate embodiment wherein the end of the leader is permanently attached into one end of the connector.

FIG. 10 is a sectional elevational view similar to FIG. 4, but showing a third alternate embodiment of the connector.

FIG. 11 is a plan view of the connector shown at FIG. 10.

FIG. 12 is a side elevational view, partly in section, showing a fourth alternate embodiment of the connector.

FIG. 13 is a transverse sectional view as taken from the indicated line 13—13 at FIG. 12.

FIG. 14 is an elevational view, partly in section, showing a fifth alternate embodiment of the connector.

FIG. 15 is a transverse sectional view as taken from the indicated line 15—15 at FIG. 14.

Figure 1:
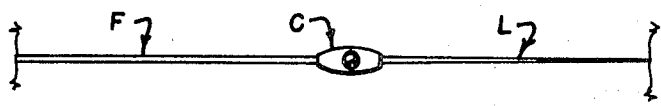
FIG. 1 is a plan view showing te improved connector connecting the end of a fly line with a leader.
Figure 2:
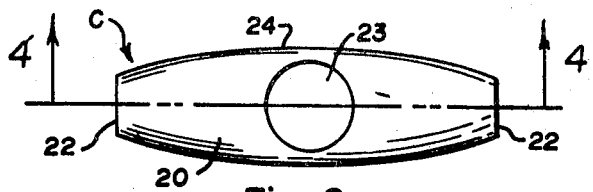
FIG. 2 is a plan view of the connector per se, but on a greatly enlarged scale.
Figure 3:
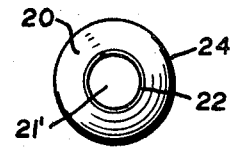
FIG. 3 is an end view of the connector.

Referring more particularly to the drawing, the improved connector C joins the end of a leader L to the end of a fly line F, as indicated at FIG. 1. The connector is formed as an elongated body 20 having longitudinal axial passageways 21 and 21' extending into it from the opposite ends 22. These passageways connect with a central transverse hole 23 which forms opposing side openings at the center of the connector. The diameter of the passageway 21 is selected to receive the end of the fly line F with a smooth, sliding fit. Likewise, the diameter of passageway 21' may be selected to receive the end of the leader L with a smooth sliding fit or it may be the same size as the passageway 21. The diameter of the transverse hole 23 is greater than the diameter of the passageway 21 to snugly receive the knotted ends of the line and leader as will be described. This diameter may be from one-third to two-thirds or more larger than the diameter of the passageway 21. As a practical matter, the diameters of the passageways 21 and 21' are preferably the same so the connector is a symmetrical unit, to thus simplify its manufacture and use. This is possible because the diameter of the large end of a tapered leader will not be much less than the diameter of the end of the fly line, and if necessary the leader may be doubly knotted to fit in the hole 23 as hereinafter described.

The body of the connector C is circular in section, tapering from the minimum diameter at each end 22, where the outside diameter of the body is only slightly greater than the passageway diameter 21, to a maximum diameter at the center 24, which may be approximately twice or more the passage diameter. This maximum diameter 24 will depend upon the diameter of the transverse hole 23, the strength of the material forming the connector and the maximum pull of the line and leader which must be resisted by the connector. The connector is preferably formed of a lightweight, strong, synthetic resin material such as nylon to withstand the pull of the line and leader. The resin may also be elastic to permit it to stretch slightly so that a knot larger than the hole 23 can be pressed into the hole to fit very tightly therein. This will permit the connector to have a maximum diameter 24 much smaller than would otherwise be possible. Such elasticity or stretchability may be obtained by using resins which, though soft, have a high tensile strength. Nylon compounds which have such a property to the degree needed are easily available, such, for example, as nylon. It is immediately apparent that the critical portions of the connector are located at each side of the hole 23 and the maximum diameter 24 must be great enough to provide sufficient material at this critical location. With a connector manufactured of nylon, this maximum diameter will not ordinarily exceed 1/8 inch and may be smaller for small lightweight fly lines. It is to be noted that nylon is one of the preferred materials for the manufacture of the connector not only because of its high strength, but also because it may be manufactured at a very low unit cost either by injection molding or by other methods. A further desirable property of nylon resides in the fact that the leaders ordinarily available are made of nylon and as such, they may be more effectively held in a nylon connector.

Figure 5:
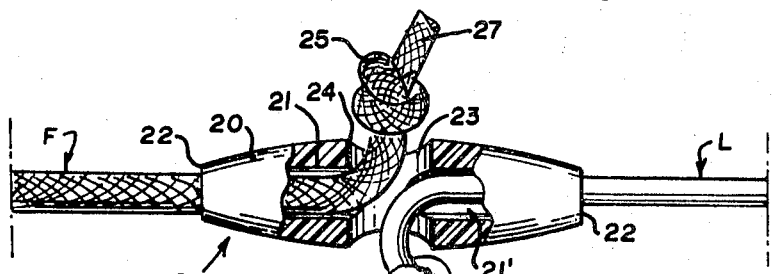
FIG. 5 is an elevational view of the connector with central portions broken away and in section, similar to FIG. 4, but with the end of a line and the end of a leader being threaded into the passageways in the connector and having knots tied in these ends preliminary to securing the line and leader to the connector.
Figure 6:
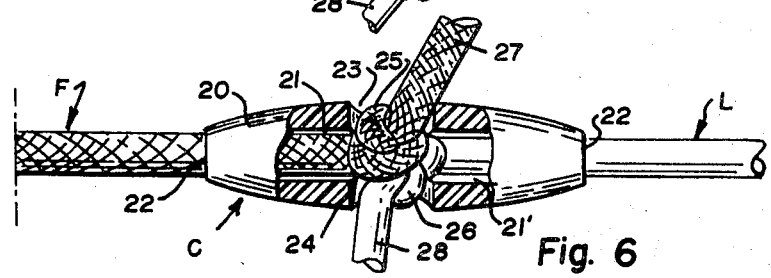
FIG. 6 is an elevational view similar to FIG. 5, but showing the manner in which the line and the leader are pulled to force the knots into the body of the connector.
Figure 7:
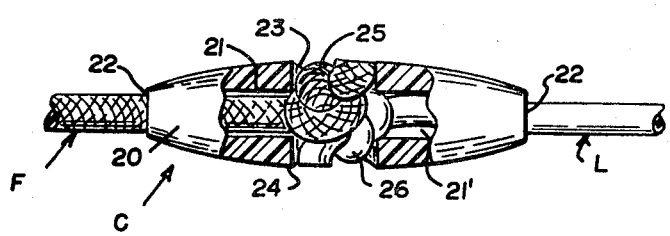
FIG. 7 is an elevational view similar to FIG. 6, but showing the manner in which the tag ends of the line and leader may be cut away when the connected line and leader are ready for use.

The manner in which the fly line F and the leader L are affixed to the connector is exemplified at FIGS. 5 – 7. The first step is to thread the end of the fly line F into the passage 21 from the end 22 of the connector and to divert the fly line through one side opening 23. Next, the end of the leader L is threaded through the passageway 21' from the other end 22 of the connector and the leader is diverted from the other side opening 23 so that the ends of the line and leader extend from near the center of the connector. As heretofore stated, the diameter of the hole 23 is greater than the diameter of the passageway 21 and is such that it will just receive a simple knot 25, such as an overhand knot or a figure-eight knot, tied at the end of the fly line. This knot 25 is tied at the end of the fly line and a similar knot 26 is tied at the end of the leader. The knot 26, at the end of the leader, is shown as a figure-eight knot, which is preferable, since an overhand knot in the smooth leader could slip. Should the diameter of the leader be substantially less than the diameter of the passageway 21', the knot 26 may be a larger knot to better fit in the hole 23.

The next step in joining the line and leader by the connector C is accomplished by pulling the line and leader from the connector so that the knots 25 and 26 are forced into the hole 23, as illustrated at FIG. 6. When both of these knots are in the opening, they will tightly fit in the connector. Thus it may be necessary to press the knots in place, as with a small punch, in addition to pulling against the line and leader.

Once the knots are tightly wedged in place in the hole 23, the tag end of the line and the tag end 28 of the leader may be cut away as illustrated at FIG. 7. This will complete the connection and the line and leader will be held together in a simple, effective manner.

As a final, optional step, if it appears desirable to do so, a drop of a suitable adhesive may be placed in the opening to cement the surfaces of the line, leader and connector together. Such an adhesive may be any type which will adhere to nylon and several types are well known to the art.

Once the lines are so secured, whether welded with an adhesive or not, they will hold in the connector solidly. An important advantage resides in the fact that this small, lightweight connector keeps the line and leader solidly interconnected in a straight, continuing alignment at the point of connection. Thus, when the line is cast, the resultant roll of the line will continue from the line to the leader without collapse or interruption at the connection. Another important feature resides in the fact that this small connector will easily pass through the eyelets of the fishing rod with or without tension on the line whenever this becomes necessary.

Various modifications of the unit shown at FIGS. 1 – 7 are possible and several alternate embodiments of the invention are set forth at FIGS. 8 – 19. In the first alternate embodiment shown at FIG. 8, the body 30 of the connector C 1 has substantially the same form as heretofore described. However, each passageway 31 and 31' extends into the connector from each end 32 to the approximate midpoint of the connector. With this arrangement, the passageway 31' may be smaller in diameter than the passageway 31 to better fit the leader if such appears to be desirable. There, each passageway connects with an individual side outlet 33 with the side outlets opening at different sides or locations of the body. Each side opening 33 is tapered from a larger diameter at the exit to a smaller diameter at the base of the opening where it merges into the passageway 31 or 31'. It follows that this tapered construction of the side opening will act as a wedging member to receive and tightly hold the knotted end of the line, or leader, whenever the line or leader is pulled into the opening.

The line and leader are threaded into these respective passageways 31 and 31' to extend from the side openings 33. The ends are knotted and pulled back into body, in the openings 33, the same as heretofore described. Also, once the knots are pulled into the openings 33, the tag ends may be cut away and an adhesive may be used to effectively cement the end of the line and the end of the leader into the small connector.

In the second alternate embodiment shown at FIG. 9, the body 30' is similar to the embodiment shown at FIG. 8, excepting that the end of the leader L is embedded in the connector C 2. Thus, in the connector C 2, only the passageway 31 and its side opening 33 are provided for the fly line. However, the end of the leader L is embedded or permanently fastened into the body of the connector and preferably, this leader end will include an enlarged head 39 to more securely connect it. In this alternate construction, the fly line will be secured to the connector the same as heretofore described.

In the third alternate embodiment shown at FIGS. 10 and 11, the connector C 3 includes a body 40 having passageways 41 and 41' which are substantially identical to the passageways heretofore described. However, the transverse hole 43 is oval or otherwise flattened, and may be inclined with respect to the normal of the connector axis. This modification makes it easier to thread the fly line and the leder into their respective passageways and from the inclined side openings of hole 43. The result is essentially the same as that heretofore described. The knots 25 and 26 will be tied in the fly line and leader as afore described and will be fitted into the hole 43 when the line and leader are pulled taut.

In the fourth alternate embodiment, illustrated at FIGS. 12 and 13, the connector C 4 has a comparatively wide gap at the center. Accordingly, the connector resembles a pair of opposing thimble-like body members 50 and 50', each having a central passageway 51 and 51' extending from opposite ends 52 of the unit. The members 50 and 50' are spaced by a gap 53 and are held in position by a longitudinal arm 54 at one side of the unit. Each passageway, at each side of the gap 53, is flared inwardly as at 53a to provide a tapered surface for better securing and holding the knotted end of a fly line or leader. The manner in which this unit is used is essentially the same as that heretofore described. A fly line and a leader are threaded through the passageways 51 and 51' to be turned to the side of the unit at the gap 53. Knots are tied at the ends of the line and leader and then the line and leader are pulled apart to pull the knots into the space 53 and against the tapered seats 53a to permit the connector to function precisely in the manner heretofore described.

In the fifth alternate embodiment illustrated at FIGS. 14 and 15, the connector C 5 is formed as a body 60. This body has passageways 61 and 61' extending thereinto from opposite ends 62. An enlarged opening 63 is provided at one side of the center of the body to connect with the two passageways 61 and 61'. Each passageway, at each side of the opening 63 is flared inwardly as at 63a to provide a tapered surface for better securing and holding the knotted end of a fly line or leader. The unit is used the same as heretofore described. A fly line and a leader are threaded through the passageways 61 and 61' to be extended from the opening 63. There, knots are tied in the fly line and leader and they are then pulled apart to pull the knots into the opening 63 against the tapered seats 63a to permit the connector to function in the same manner as heretofore described.

As heretofore stated, this connector may be manufactured of a selected synthetic resin material, and preferably, a thermoplastic resin such as nylon. Almost all of the suitable thermoplastic resins have the property of memory, that is, should an article be mechanically deformed, by stretching, twisting or the like, to a shape differing from its original shape, it will return towards its original shape when heated.

This property may be used to advantage in any of the above described embodiments of the connector to shrink the connector upon a line and leader once the lines are threaded into the connector and knotted. The memory function may be obtained by deforming either the stock material from which a connector is manufactured or by deforming the connector itself as a final step in its manufacture. In either event, the deforming step will be directed towards enlarging the openings through the connector and especially, the side openings such as 23 of FIGS. 3 or 33 of FIG. 8. After the connector material is so deformed, the line and/or the leader are threaded into their respective passageways, the ends are extended from the side openings and knotted or formed with an enlargement. The line and leader are then pulled to set the knots, or enlargements, into the side openings. The connector is then gently heated in any suitable manner to a temperature where the plastic memory action operates. The connector quickly and tightly grips the line and leader.

If the stock material from which the connector is to be manufactured is to be pre-stretched, the material may be stretched axially and at the same time the passageway through it is enlarged as with a mandrel.

Figure 4:
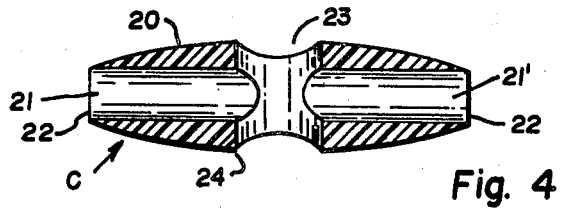
FIG. 4 is a longitudinal sectional elevational view of the connector as taken from the indicated line 4—4 at FIG. 2.

If the stretching is to be a final step in the manufacture of the connector, mandrels may be used to increase the diameter of the passageways in it. For example, a single mandrel could be used for a continuous passageway 21 of a connector such as shown at FIG. 4. However, a pair of opposed mandrels would be used for the passageways 31 and 31' of a connector such as shown at FIG. 8. In either case, a pair of opposing mandrels would enlarge the side openings 23 and 33 of these two constructions.

The gripping action of a connector may be obtained by shrinking a pre-stretched connector and be used to advantage to embed the end of a leader, or line, into the connector. For example, the leader end L may be so embedded, as shown at FIG. 9. In preparing the leader for such embedment, the end of the leader may be enlarged as at 39 to enhance the grip of the connector about the leader. Another manner of reinforcing the natural frictional grip of the connector about a leader embedded within it involves the addition of particles of metal or the like at the passageway wherein the leader end is inserted. In such an arrangement, an enlargement is not necessary, and the shrink of the connector through a plastic memory action will grip the leader, and at the same time the particles of metal or the like will enhance this gripping by actually digging in into the surface of the portion of the leader or line being embedded.

Figure 16:
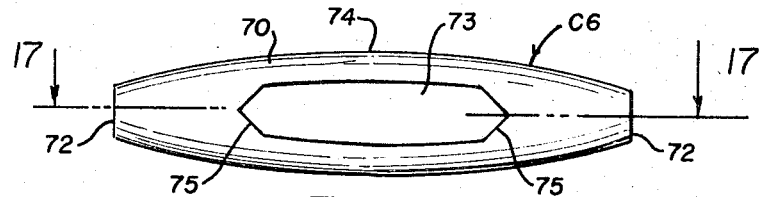
FIG. 16 is a plan view of a sixth alternate embodiment of the connector.
Figure 17:
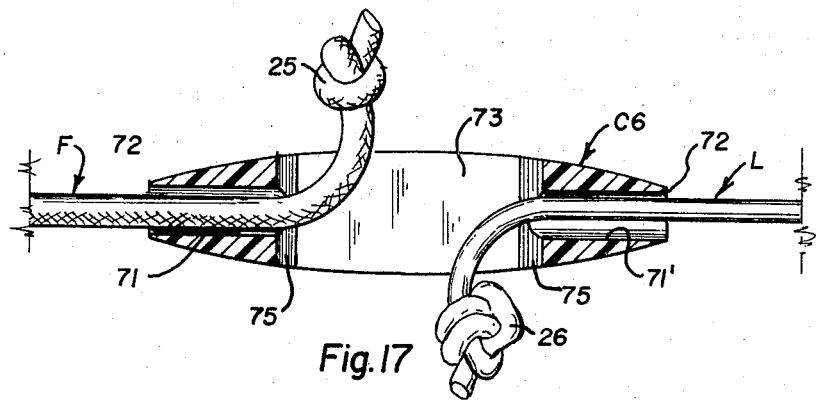
FIG. 17 is a transverse sectional view as taken from the indicated line 17—17 at FIG. 16, but showing the end of a line and the end of a leader threaded into the passageways and having knots tied in these ends similar to FIG. 5.
Figure 18:
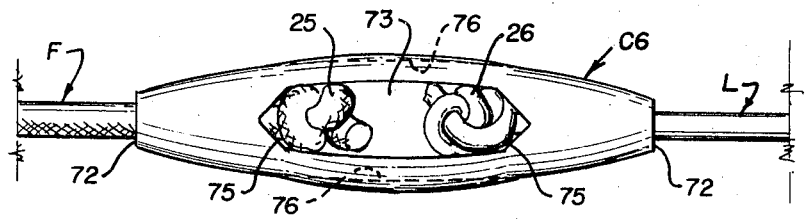
FIG. 18 is a plan view similar to FIG. 16, but showing the manner in which the line and leader are pulled into the connector and showing in broken lines the position from which the connector flexed when the knots are pulled into the slot.

In the sixth alternate embodiment shown at FIGS. 16 to 18 the connector C6 includes a body 70 having passageways 71 and 71' which are substantially identical to the passageways heretofore described. The general form of this unit is also similar, being elongated and cigar-shaped, with ends 72 made of a flexible material such as nylon. However, the transverse slotted hole 73 at the center of the unit is elongated along the longitudinal axis of the unit. This hole 73 has a width which is only slightly greater than the diameter of passageways 71 and 71' to provide sufficient material at each side of the hole without unduly increasing the maximum diameter 74 of the connector. The length of the hole 73 may be approximately one-half the length of the connector, but this dimension can be considerably varied. Preferably, however, this length is greater than the combined diameters of the knotted ends 25 and 26 of the line F and leader L as clearly shown at FIG. 16. Each end 75 of the hole 73 is preferably notched, as illustrated, to provide a wedge-like junction with its passageway 71 or 71', although the bottom of each notch should be rounded slightly to prevent splitting. The surface of each longitudinal side wall of this hole 73 may be flat and plane or the surface may be angled slightly to form a flattened dihedral, or this surface may be longitudinally arched slightly as illustrated. Other variations of structure, such as rounding the sharp edges, may be applied to this unit without changing its basic functional structure.

The connector C6 is used as heretofore described. The end of a fly line F and the butt of the leader L are threaded through the respective passageways 71 and 71' and are knotted in a suitable manner as illustrated at FIG. 17. The fly line and the leader are then pulled to pull the knots into the slotted hole 73, as illustrated at FIG. 18. In doing so, the knots will tightly press against the sides of the slotted hole 73 and flex the connector. Such flexing is indicated at FIG. 18, the center portion of the connector being flexed from the dotted line position 76 at each side of the hole 73 to the solid line position as shown. This flexing holds the knots tightly in place without the knots 25 and 26 necessarily being jammed together.

Figure 19:
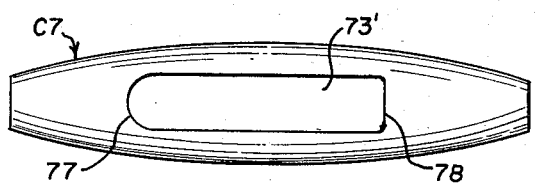
FIG. 19 is a plan view similar to FIG. 16, but showing variations of form in the end of the slotted opening.

FIG. 19 shows a further variation of the connector, and this modified embodiment C7 may be identical to that heretofore described in connection with FIGS. 16, 17 and 18, excepting for the ends of the slotted hole 73', which are shown at one end as a circular arch 77 and at the other end as by a flat abutment as at 78.

The foregoing describes the invention in considerable detail. However, it is obvious that others skilled in the art can build and devise alternate and equivalent constructions which are nevertheless within the spirit and scope of this invention. Hence, it is desired that the protection be limited not by the constructions illustrated and described, but only by the proper scope of the appended claims.

I claim:

1. A connector in combination with knotted ends of two pliable lines, which lines do not differ greatly in diameter, such as a fly line and a leader, and comprising:

a tubular connecting member constructed of a stretchable material and having an axial passageway extending through it and a longitudinally elongated side opening intersecting the passageway having a length greater than the combined diameters of the said knotted ends of the two lines, said passageway being slightly larger in cross-section than the diameter of one of said lines, the width of said side opening being somewhat larger than the diameter of said lines and less than a knotted end thereof, whereby the side opening is dimensioned with respect to said knotted ends such that, when assembled, the knotted ends are forced into the side opening by stretching the connector, thereby effecting a tight fit of the knotted ends within said side opening, said connecting member being proportioned such that the axial passageway receives the lines with a small clearance, the clearance being such that a knot in a line cannot fit in the passageway, with one line extending into the passageway from one end thereof, with the other line extending into the passageway from the other end thereof, and with the knotted ends of each line being fitted within the side opening, whereby to interconnect the lines.

2. A connector as defined in claim 1, wherein said connecting member is made of a synthetic resin plastic.

3. A connector defined in claim 1, wherein:
said side opening is longitudinally slotted, with the length of the slot being in the approximate range of one-half the length of the member.

4. In the connector defined in claim 1, wherein:
an end of the slot is notched to provide a seat whereagainst a knot may be pulled.

5. In the connector defined in claim 1, wherein:
the end of the slot is arched.

* * * * *